Patented Sept. 28, 1926.

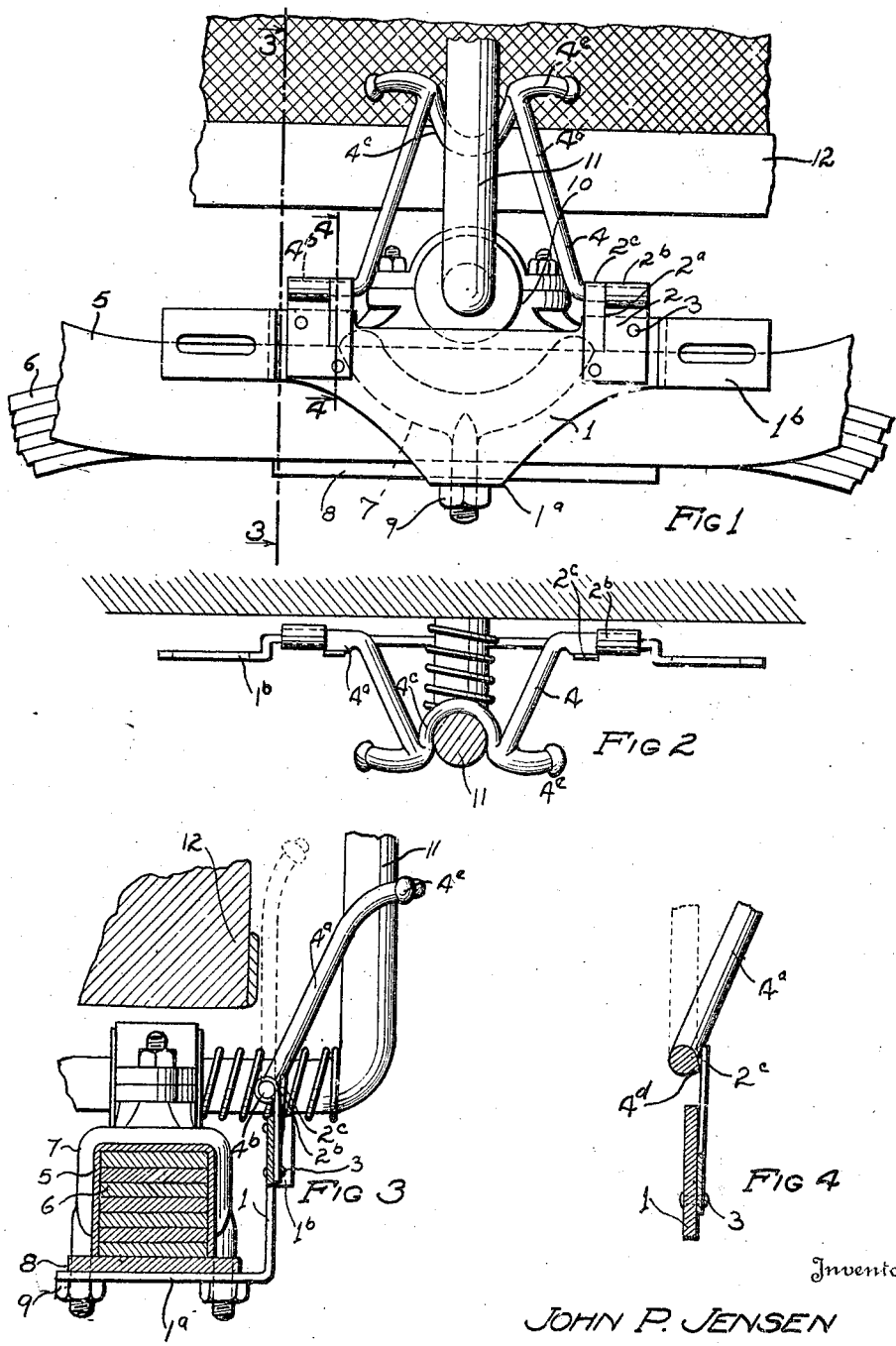

1,601,175

UNITED STATES PATENT OFFICE.

JOHN P. JENSEN, OF ESCONDIDO, CALIFORNIA.

CRANK-RETAINING DEVICE FOR AUTOMOBILES.

Application filed September 11, 1925. Serial No. 55,649.

My invention relates to a crank retaining device for automobiles, and the objects of my invention are: first, to provide a very simple and economically constructed device of this class; second, to provide a device of this class in which the means for supporting the crank retaining member forms also the spring means for resiliently retaining the crank retaining member in and out of engagement with the crank of the automobile, as desired; third, to provide a device of this class having a crank retaining member pivotally mounted at its one end and provided at its free end with a loop portion adapted to receive and engage the crank of the automobile and be resiliently held thereagainst by a spring means on its supporting means; fourth, to provide as a whole a novelly constructed crank retaining device, and fifth, to provide a device of this class which is durable, practical, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary front elevational view of an automobile, showing my crank retaining device in connection therewith for holding the crank of the automobile in an upright position; Fig. 2 is a top view thereof; Fig. 3 is a sectional elevational view thereof, taken through 3—3 of Fig. 1, and Fig. 4 is an enlarged sectional elevational view of the supporting and retaining portion of my device, showing the crank retaining member fragmentarily in a position to retain the crank in an upright position and showing the same by dotted lines in an out-of-the-way or normally disengaged position from the crank of the automobile.

Like characters of reference refer to similar parts and portions throughout the several views of the drawings.

The supporting bracket 1, resilient journal and spring members 2, rivets 3, and the crank positioning or retaining member 4, constitute the principal parts and portions of my attachment or device in its preferred form of construction.

The particular type of automobile, shown fragmentarily in the drawings, on which my device is mounted, is one known as the "Ford" automobile. The front portion thereof consists of a transversely positioned supporting channel 5 in which are positioned the middle portions of the leaf spring members 6, a U-shaped clamp 7 extending over and around the channel 5 and downwardly at the front and rear sides thereof, a plate 8 positioned at the lower side of the channel 5 and leaf spring unit, nuts securing the plate 8 to the clamp member 7 and the channel 5, a journal 10 secured to the upper portion of the clamp member 7, a crank 11 rotatably mounted at its crank portion in said journal, and the radiator 12 positioned above the channel 5 and behind the crank 11, as shown.

The supporting bracket 1 extends transversely of the automobile in front of the supporting channel 5 thereof and is reduced and bent backwardly at its middle portion, as indicated by $1^a$ in Figs. 1 and 3. This backwardly extending or bent portion $1^a$ of the supporting bracket 1 is secured between the plate 8 and the nuts 9 at the under side of the plate, from which portion the supporting bracket extends upwardly. The laterally extended ends $1^b$ of the supporting bracket 1 are offset forwardly and provided with elongated slots for supporting the conventional vehicle license plates. Positioned intermediate the forwardly offset portions $1^b$ and adjacent either of them are the journal and spring members 2, which are secured at their lower portions to the front side of the supporting bracket 1 by means of the rivets 3 or any other suitable means. Each of the members 2 is split downwardly from its upper end, as indicated by $2^a$, forming the leaf spring portion $2^c$ at its inner portion or end. The other portion of the member 2 formed by the slit is rolled backwardly forming journal portions $2^b$.

The crank retaining member 4 is preferably made of a forging in double U form, the U portions being substantially opposed to each other. The main legs $4^a$ of the member 4 converge upwardly and are provided at their lower ends with laterally extending bearing portions $4^b$ which are rotatably mounted in the journal portions of the members 2. The upper ends of the legs $4^a$ are spaced apart and connected with each other by the U portion $4^c$, the outer ends of the legs of which portion 4ᶜ connect with the upwardly converging ends of the legs 4ª. The U portion 4ᶜ is adapted to straddle the arm of the crank 11 when said crank is in an upright position, shown in the drawings, and when the crank retaining member 4 is shifted outwardly, as shown by solid lines in Fig. 3. Intermediate the lower ends of the legs 4ª and the bearing portions 4ᵇ of the member 4 are provided forwardly extending cam portions 4ᵈ which are adapted to engage the spring members or portions 2ᶜ of the members 2 at opposite sides of a perpendicular line extending toward the spring member near the point of engagement thereof with the cam portion for holding the member 4 in an outward or crank retaining position, shown by solid lines in Fig. 4, or in an out-of-the-way or substantially upright position, as shown by dotted lines in Fig. 4.

The upper free end of the member 4 is provided with a pair of outwardly extending lugs or handle portions 4ᵉ to facilitate the shifting of said members to either position, as shown.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a device of the class described, a supporting bracket adapted to be secured to the front portion of a vehicle contiguous to the crank thereof and provided at its upper portion with journal portions, a crank retaining member pivotally mounted at its lower end in said journal portions and provided at its upper free end with a U-shaped portion adapted to receive and straddle the arm of the crank of the vehicle intermediate the ends of the arms, cam means on said crank retaining member at the pivotal portion thereof, and spring means in connection with said bracket adapted to variously engage said cam means, for resiliently retaining said member in engagement with the arm of said crank and out of engagement therewith.

2. In a device of the class described, a bracket adapted to be secured at the front portion of a vehicle contiguous to the crank portion thereof and provided at its upper end with journal portions, a substantially U-shaped crank retaining member provided at its lower end with laterally extending supporting portions pivotally mounted in the journal portions of said bracket and provided at its upper free end with a U-shaped portion adapted to receive and straddle the arm of the crank of said vehicle and loosely support the same therein, said crank retaining member being provided at its lower end near the portions pivotally mounted in the journal portions of said bracket with extended cam portions, and leaf springs mounted on said bracket adapted to engage said cam portions for retaining said crank retaining member in engagement with the arm of said crank or in a disengaged position therefrom.

3. In a device of the class described, a supporting bracket adapted to be secured to the front portion of a vehicle contiguous to the crank portion thereof, a pair of journal and spring members secured to said bracket and extending upwardly therefrom, a crank retaining member provided at its lower end with laterally extending supporting portions pivotally mounted in the journal portions of said journal and spring members and provided at its upper free end with a U-shaped portion adapted to receive and straddle the arm of the crank of said vehicle for holding the same in an upright position, and cam means on the laterally extending supporting portions of said crank retaining member adapted to variously engage the spring portion of said journal and spring members.

4. In a device of the class described, a supporting bracket adapted to be secured to the front portion of a vehicle a pair of resilient metal plates secured to said bracket and extending upwardly therefrom, said plates being slit downwardly from their upper ends, each forming a journal portion and a leaf spring portion, and a substantially double U-shaped crank retaining member formed in a large inverted U and a smaller U portion at the upper end of said member adapted to receive and straddle the arm of the crank of said vehicle, the lower ends of the legs of said crank retaining member being bent outwardly and pivotally mounted by said outwardly bent portions on the journal portions of said plates, said outwardly bent portions being provided with forwardly extending cam portions adapted to engage the spring portions of said plates and retain the crank retaining member in engagement with the arm of the crank of the vehicle or in a disengaged position relatively thereto.

5. In a device of the class described, a supporting bracket formed in a right angle, the one horizontal portion thereof being secured to the front portion of a vehicle and the other portion extending upwardly therefrom, a pair of resilient metal plates, journal and spring members secured to said bracket and extending upwardly therefrom, and a crank retaining member provided at its upper end with a U-shaped portion adapted to receive and straddle the arm of the crank of said vehicle and pivotally mounted at its lower end in the journal portions of said journal and spring members, the lower ends of said crank retaining members being provided with cam portions adapted to variously engage the spring portions of said journal and spring members for retaining said crank retaining member in engagement with the arm of said crank or in a disengaged position relatively thereto.

In testimony whereof, I have hereunto set my hand at San Diego, California, this 15th day of July, 1925.

JOHN P. JENSEN.